United States Patent [19]
Zausner

[11] Patent Number: 5,187,738
[45] Date of Patent: Feb. 16, 1993

[54] TELEPHONE RELAY COVER

[76] Inventor: Fredrick Zausner, 50 Soundview Dr., Port Washington, N.Y. 11050

[21] Appl. No.: 755,339

[22] Filed: Sep. 5, 1991

[51] Int. Cl.⁵ .................. B65G 11/04; H04M 17/02
[52] U.S. Cl. .............................. 379/145; 379/440; 194/202
[58] Field of Search .............. 379/145, 437, 440, 451; 194/202

[56] References Cited

U.S. PATENT DOCUMENTS 5,054,056 10/1991 Blythe ............................ 379/145

Primary Examiner—Stafford D. Schreyer
Attorney, Agent, or Firm—Schweitzer Cornman & Gross

[57] ABSTRACT

A cover for a coin return relay assembly used in coin-operated telephones is formed of a tough, puncture-resistant material formed into a generally U-shaped barrier. The barrier is mounted on the relay such that it overlies the relay armature and coin return chute, preventing the insertion of probe-like instruments through the telephone box to contact such elements. The side walls of the cover are offset from the planes of the adjacent telephone housing walls, while the cover is mounted to the relay in a non-rigid manner to limit the ability of penetration therethrough.

9 Claims, 2 Drawing Sheets

TELEPHONE RELAY COVER

The present invention relates to a device for increasing the security of coin-operated telephones and, in particular, is directed to a cover and guard apparatus to protect the coin return relay apparatus therein.

BACKGROUND OF THE INVENTION

Public, coin-operated telephones have long been considered a tempting target for vandalism. Often located in secluded or out-of-the-way places, and often retaining a large amount of deposited coins, they are subject to attack by those attempting to obtain access to the enclosed coins. Often such attack is by entry into the lower portion of the telephone bearing the coinbox.

To guard against such attack, a variety of mechanisms have been developed to increase the strength and rigidity of the telephone box unit.

A more sinister mechanism for defrauding the telephone company has been developed, however, which does not include the physical removal of the coinbox to collect deposited coins. Rather, it involves the diversion of coins deposited such that they never enter the coinbox, but are routed into the coin return receptacle for removal, although the coin counting and sensing mechanism of the telephone records them as being deposited, thus allowing the telephone call for which they have been deposited to be completed. Upon completion of the call, the coins drop not into the coinbox but into the coin return receptacle.

As coins are deposited in the telephone, they are sensed and retained in a chute, pending completion of the call. If the call is completed, the coins fall into the coinbox, while if the call is not completed a coin return relay is activated, causing the coins to be diverted out into the coin return receptacle. With long distance or overseas calls in particular, a substantial quantity of coins may be deposited and maintained in the intermediate position pending completion of the call.

The fraud consists of boring a small entryway through the telephone housing such that a probe inserted therethrough can contact the coin return relay armature, or the internal passageway door to which it is connected, so that the door is repositioned to direct the coins to the coin return slot when they are released upon completion of the call. The coins are thus diverted from their intended path into the coinbox, thus defrauding the telephone company of its payment for the telephone call.

It is accordingly the purpose of the present invention to provide an apparatus which prevents the improper operation of the coin return relay and diverter system.

Yet a further purpose of the present invention is to provide such an apparatus which may be retrofit upon conventional coin telephone apparatus without modification.

Still another purpose of the present invention is to provide coin relay protection in a device which is able to sit directly upon the relay unit yet not inhibit or affect proper operation thereof.

BRIEF SUMMARY OF THE INVENTION

In accordance with the above and other features and objects, the present invention comprises a rigid barrier and cover having front and side walls which embrace the coin return relay assembly to provide an internal blocking wall, not visible from the exterior of the telephone, between the relay and the housing of the telephone. The apparatus is mounted directly upon the relay by use of an integral bracket which allows the apparatus to be properly positioned and to deflect attempts to pierce its sides while not interfering with operation of the relay. The walls of the apparatus are further aligned in an offset manner from the adjacent housing walls of the telephone unit to further deflect entry through the housing and prevent drills and similar devices from penetrating the apparatus.

BRIEF DESCRIPTION OF THE DRAWINGS

A fuller understanding of the present invention and the features and advantages thereof will become apparent upon consideration of the following discussion of a preferred, but nonetheless illustrative, embodiment of the invention when taken in conjunction with the annexed drawings, wherein.

DETAILED DESCRIPTION OF A PREFERRED EMBODIMENT

Figure 5:
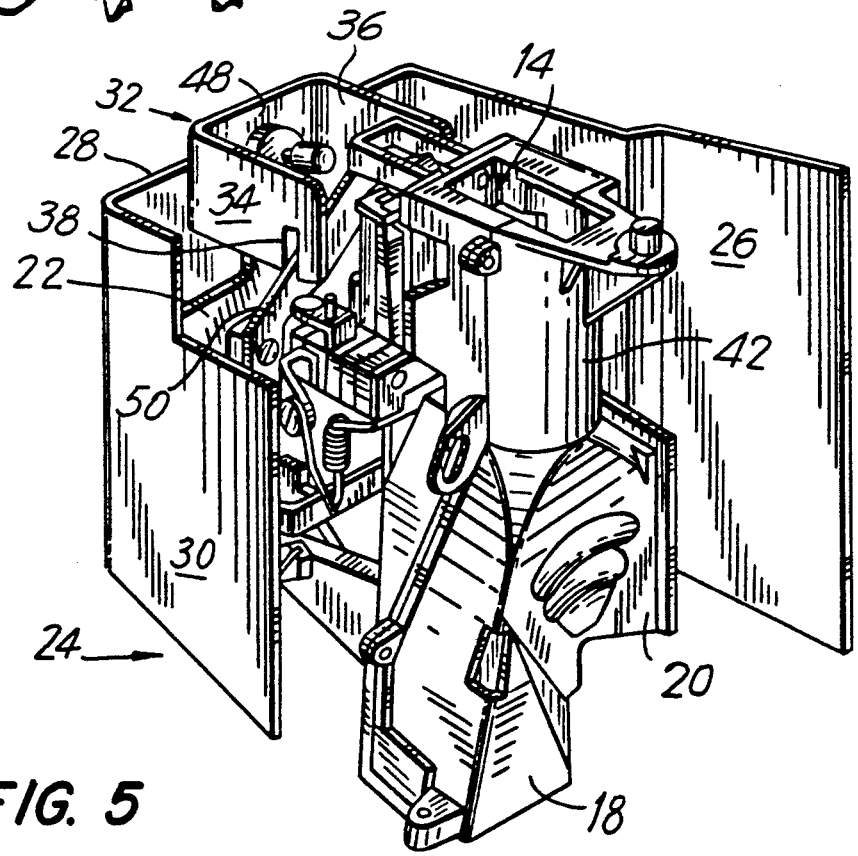
FIG. 5 is a perspective elevation view from the rear of the relay further presenting the positioning of the apparatus of the present invention with respect thereto.

With reference to the Figures, a typical coin telephone includes the telephone housing box 10, which may be of one or more portions, in the interior of which the electromechanical apparatus for operation of the telephone is located. A coin return relay unit 12 is generally located in the lower portion of the box and, as may be seen in FIGS. 2 and 5, includes a vertically-extending entranceway 14 into which deposited coins fall after they have been inserted through the coin slot 40 and sensed by appropriate detection and counting circuitry (not shown).

An arm 16 is located within the entranceway, and is connected to appropriate electrical circuitry such that the passage of coins thereby causes the arm to pivot, generating an electrical signal to confirm transit of the coins and receipt within a storage area 42. A door 44 is located at the bottom end of the storage area, which leads both to a chute 18 which directs the passed coins to the coinbox, as well as to diverting chute 20, which leads to the coin return box. The door is normally positioned horizontally at the intersection of entranceway 14 and chute 18 to retain the deposited coins within the storage area during the pendency of a call. It is released at call termination to permit the coins to drop either through the coinbox chute or the coin return chute.

Figure 1:
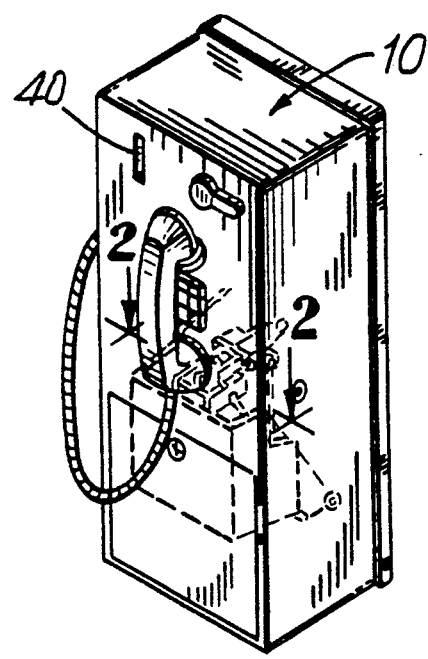
FIG. 1 is a perspective view of a typical coin telephone depicting the coin relay and apparatus of the present invention in phantom.
Figure 2:
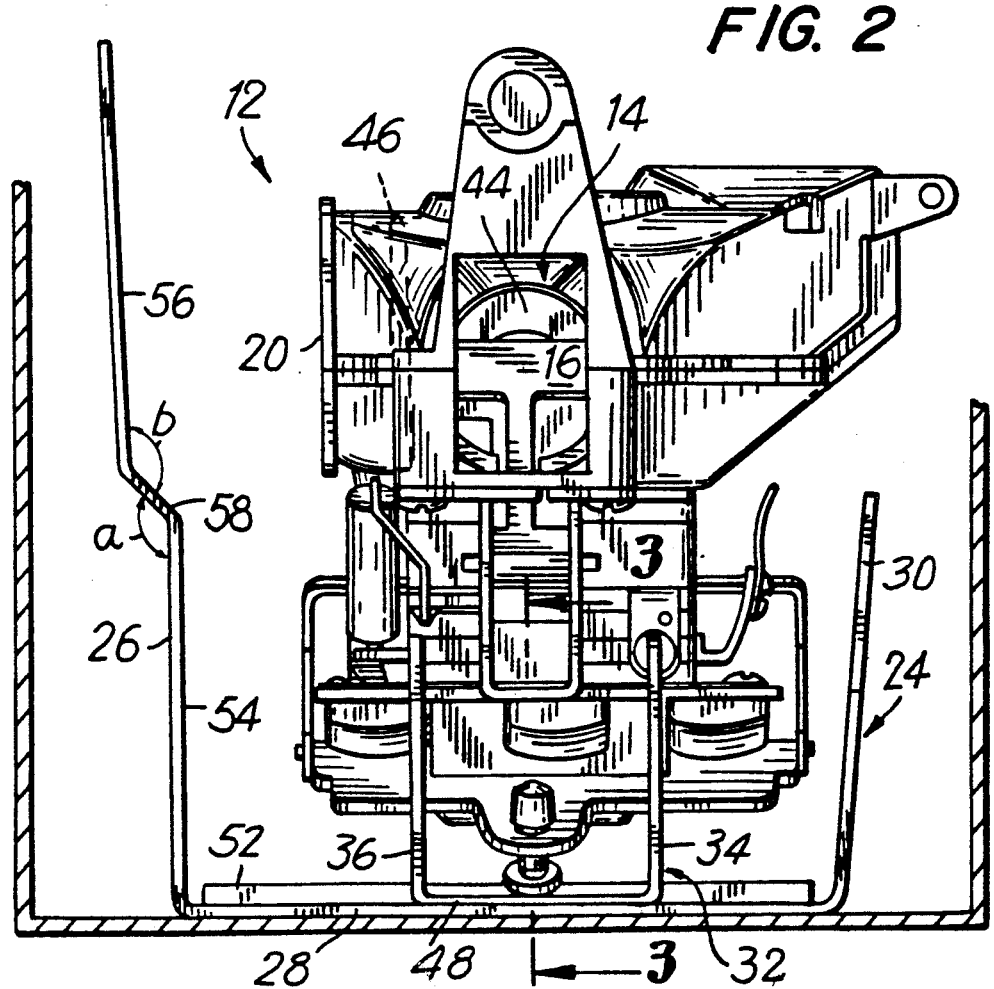
FIG. 2 is a top plan view in section taken along line 2—2 of FIG. 1 depicting the invention in place upon the relay.

Also located within the relay assembly, in the area of the intersection of the entranceway and exit chutes, is a diverting plate 46, shown in phantom in FIG. 2, which is normally in the vertical position to block the coin return chute 20 such that the released coins fall into the coinbox through the coinbox chute 18. The plate can also pivot to an angled position, whereby the entrance to the coinbox chute is closed and the dropping coins are diverted into the coin return chute 20.

Figure 3:
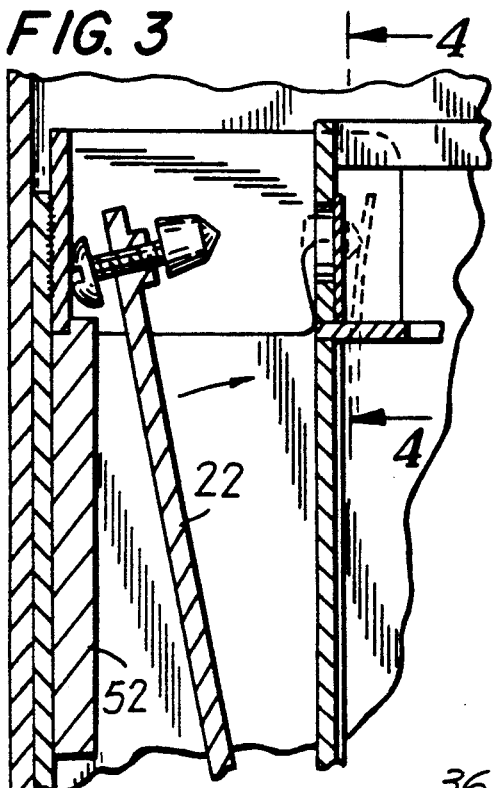
FIG. 3 is an elevational view in section taken along line 3—3 of FIG. 2.
Figure 4:
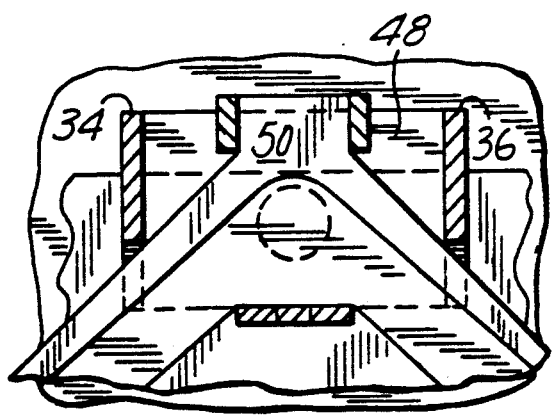
FIG. 4 is a detail elevation view in section taken along line 4—4 of FIG. 3, illustrating the mounting of the apparatus upon the coin return relay.

The position of the plate 46 is controlled by relay armature 22, which is activated by an electrical impulse received by the relay coil. Pivot of the armature in a clockwise direction, as shown in FIG. 3, causes the diverting plate to assume the position in which the coins are passed to the exit chute, and typically occurs when a call has not been completed and the deposited coins are to be returned to the caller. Such activation may be done automatically by the telephone system or upon entry of a remote command by a central station operator.

As the diverting plate 46 is located at the intersection of the coin return chute 20 and the lower portion of entranceway 14, with its face generally parallel to a side wall of the telephone box, a probe-like instrument inserted into the coin return chute 20 can place and maintain the plate in the deflected position, as can mechanical pressure exerted against armature 22, causing the armature to be pivoted to the diversion position without the proper electrical impulse being applied to the relay. By drilling a small entranceway through the telephone box 10 at the appropriate point on its surface, such a probe can be inserted to contact either the plate or armature.

The barrier apparatus 24 of the present invention comprises left side, front and right side panel elements 26, 28, 30, respectively, typically formed of stainless steel, the surfaces of which may be nitrided or otherwise treated to provide further surface toughness. The panels are joined together to form a generally U-shaped configuration in plan as seen in FIG. 2.

Mounted to the inward-facing surface of the front panel 28 is bracket 32, comprising parallel bracket arms 34, 36 each having an upwardly-extending slot 38 from the arm's lower edge. The arms 34, 36, which are supported by intermediate arm plate 48, are dimensioned and located to permit the bracket and affixed barrier unit to be mounted and supported in position directly upon the upper, generally triangular-shaped portion 50 of the relay frame.

A secondary plate 52 may be welded or otherwise affixed to the inner surface of front panel 28 to provide further protection against attack in this area. As may be best seen in FIG. 2, the left and right side panels 26 and 30 have angular offsets from the perpendicular formed between the front and sides of the telephone cabinet box 10. This offset assists in deflecting drilling bits from obtaining a "bite" or "purchase" against the guard apparatus, further frustrating penetration thereof. In particular, right side panel 30 forms an angle of about 95 degrees with front panel 28, while left side panel 26 has first perpendicular portion 54 adjacent front panel portion 28, while second portion 56 is offset about 5 degrees from the parallel to the adjacent cabinet wall. The transition between the first and second portions may be accomplished by intermediate section 58 at angle "a" of about 135 degrees, followed by distal portion 56 at an angle "b" of about 140 degrees.

As may be appreciated, the front and side walls are so dimensioned such that, while they overlie the sides of the relay assembly 12 as well as the coin return chute 20, they do not interfere or conflict with the normal operation thereof, and lie within the available space between the relay assembly and the walls and other elements of the telephone unit. If required, the side walls may be provided with slots or apertures as may be required to insure clearance, so long as the areas overlying the armature and coin return chute remain fully protected. Further, since the barrier apparatus is mounted solely by the bracket element 32, it is not rigidly retained in place, thus further preventing an effective means of penetration for a drill bit element, the play resulting from contact with the drill bit providing further difficulties in obtaining an effective bite by the bit. In addition, because of such play, any hole ultimately drilled through the barrier apparatus would likely be displaced from the hole in the housing when the bit is removed, thus making it more difficult for the probe element to be inserted through the barrier. It is to be recognized that the foregoing is an illustrative example of the present invention, and that adaptations and modifications thereof may be achieved without departing from the intended scope of the invention.

I claim:

1. Apparatus for the protection of a coin return relay assembly of a coin-operated telephone, said relay having a relay armature operatively connected to a diverting plate mounted within a coin passageway through the relay assembly, said apparatus comprising front and side walls formed of a tough, penetration-resistant plate material, said front and side walls being formed into a generally U-shaped configuration; and mounting means affixed to said front wall such that said apparatus is mounted and supported upon said relay whereby said walls are in an interposed relation between said armature and diverting plate and the side walls of the telephone housing.

2. The apparatus of claim 1, wherein said relay assembly comprises a upstanding, generally triangular frame member, said mounting means being adapted to fit upon said triangular frame member.

3. The apparatus of claim 2, wherein said mounting means comprise a bracket having a pair of parallel arms, each of said arms being adapted to fit upon said triangular frame member.

4. The apparatus of claim 1, wherein said side walls comprise portions mounted in a non-parallel relationship with respect to the adjacent walls of the telephone housing.

5. The apparatus of claim 4, wherein said non-parallel relationship is an approximately 5 degrees offset from parallel.

6. The apparatus of claim 3 wherein said front wall is of a thickness greater than that of said side walls.

7. The apparatus of claim 3 wherein said plate material is stainless steel.

8. The apparatus of claim 7 wherein said stainless steel is nitride.

9. A method for the protection of a coin return relay assembly of a coin-operated telephone having a relay armature operatively connected to a diverting plate within a coin passageway, comprising orienting a barrier apparatus having front and side walls in a generally U-shaped configuration upon said relay such that said walls are interposed between said armature and diverting plate and the side walls of the telephone housing.

* * * * *